E. H. SIGURDSON.
MECHANICAL MOVEMENT.
APPLICATION FILED DEC. 14, 1916.

1,268,289.

Patented June 4, 1918.
6 SHEETS—SHEET 2.

Fig. 2

Inventor
Eirikur Hjalmar Sigurdson
By D. R. O'Neail
His Attorney

E. H. SIGURDSON.
MECHANICAL MOVEMENT
APPLICATION FILED DEC. 14, 1916.

1,268,289.

Patented June 4, 1918.
6 SHEETS—SHEET 5.

Inventor
Eirikur Hjalmar Sigurdson
By D. R. O'Neal
His Attorney

UNITED STATES PATENT OFFICE.

EIRIKUR HJALMAR SIGURDSON, OF WINNIPEG, MANITOBA, CANADA.

MECHANICAL MOVEMENT.

1,268,289.  Specification of Letters Patent.  Patented June 4, 1918.

Application filed December 14, 1916. Serial No. 136,944.

*To all whom it may concern:*

Be it known that I, EIRIKUR HJALMAR SIGURDSON, a citizen of the Dominion of Canada, residing at the city of Winnipeg, in the Province of Manitoba, in the Dominion of Canada, have invented certain new and useful Improvements in Mechanical Movements, of which the following is a specification.

My invention relates to devices by means of which rotary motion may be converted into reciprocation motion or vice versa, and the object of the invention is to provide a simple device for the purpose having means of adjustment whereby the motion produced may be varied from circular to elliptical or may be made distortions thereof.

As the device is capable of a great many useful applications a number of these are introduced as illustrative only, and with these and certain other objects in view the invention consists of the novel arrangement and combination of parts described in the following specification and then more particularly pointed out in the appended claims, reference also being had to the accompanying drawings in which similar characters of reference refer to similar parts throughout the different views, and in which—

Referring to the drawings and with special reference to Figs. 1 to 18 inclusive, A indicates a circular casing having a peripheral wall 1 and ends 2 and 3, the end 2 having an annular casting 4 concentrically secured thereto.

The casing A is supported on a frame work B having an upstanding end 5 supporting a ring 6 surrounding the casting 4, the casting and ring being shaped to afford a ball race having the balls 7 interposed between the two parts. The opposite end of the casing A is rotatably mounted on a shaft 8, carried by the pedestal 9 forming part of the frame B. It will be noted that the shaft 8 is secured in the head of the pedestal by a setscrew 10, so that rotation of the shaft is prevented. A stepped pulley 11 is secured to the end 3 so that the casing may be rotated at different rates of speed from a suitable source of power.

Figures 7, 8, 9, 10, 11, 13:
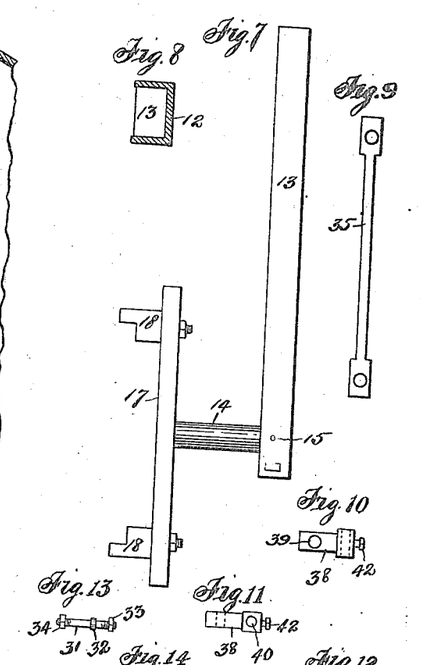
Fig. 7 is the lathe head with its immediate connections.
Figs. 8, 9, 10, 11, 12, 13, 14, 15, 16, 17, and 18 are details of the means used to operate the lathe head.
Figures 12, 14:
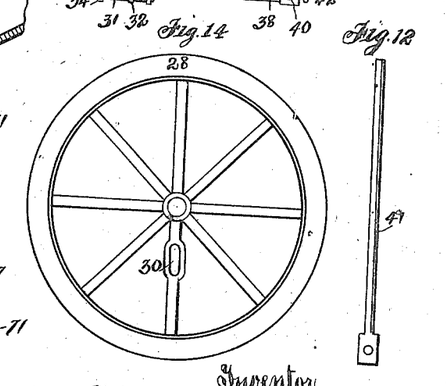

A member, of which Fig. 8 shows an end view, is shaped to form three sides of a hollow tube or pipe 12 which passes diametrically across the casing A and is secured to the inner side of the end 2 thereof, the end thus forming the fourth side of the tube. A member 13 is reciprocably disposed in the tube 12 and a pin 14 is secured in the member 13, preferably by means of a rivet 15, the pin 14 standing at right angles to the member 13 and projecting out therefrom through the end 2 of the casing by way of a slot 16 formed therein in line with the member 13 and within the limits of the casting 4.

A lathe head 17 is carried at the end of the pin 14, the head being provided with adjustable jaws 18 between which to receive a piece of wood to be shaped.

19 indicates a collar not wholly necessary, on the pin 14 outside of the end 2 of the casing.

A block 20 is immovably fixed in the tube 12 just below the lower limit of the movement of the reciprocable member 13, the block having an opening therethrough for passage of a bolt or rod 21 having its upper end secured in the end of the member 13 by a nut 22 in the manner of a joint bolt connection. A compression spring 23 is maintained under compression on the rod 21 below the block 20 by the washer 24 and nut 25, so that the power of the spring is exerted on the member 13 in the direction of the block 20, the normal position of the pin 14 being thus at the end 26 of the slot 16 in the head 2 of the casing.

The casing A is divided by a partition 27, and a fly-wheel 28 (Fig. 14) is carried centrally thereof by a pin 29. A slot 30 is provided in one of the spokes of the wheel 28 to receive a crank-pin 31 (Fig. 13), the crank-pin being provided with a collar 32 to engage one side of the spoke and a nut 33 to engage the opposite side thereof, so that the crank-pin may be adjustably secured in the slot 30. The crank-pin is further provided with an end nut 34 for a purpose clearly shown hereinafter. A connecting rod 35 extends between the crank-pin 31 and a second pin 36 on both of which it is mounted in the usual manner, the pin 36 being secured in the upper part of the member 13 and extending out therefrom through a slot 27 formed in the rear side of the tube 12. A casting 38, shown separately in Figs. 10 and 11, is provided with an opening 39 by means of which it is mounted on the crank-pin 31, and is provided with a further opening 40 at right angles to the opening 39, wherein to receive the end of a connecting rod 41, the casting being provided with a set screw 42 by means of which the rod may be adjustably secured in the casting. The connecting rod 41 extends to and is mounted upon a bolt 43 which passes through a slot 44 in the partition 27, the bolt having a nut 45 by which the rod connection is maintained, and spaced blocks 46 and 47 adapted to engage and slide upon the opposite faces of the partition 27. The blocks 46 and 47 may be further connected by the pins 48 to maintain their relationship.

The bolt 43 ends in an eye 49 having pivotal connection with a link 50 forming a swivel connection with the shive block 51 in which is mounted the shive 52, and a guide chain 53 passes around the shive 52. The shive and its connections are shown separately in Fig. 18. The ends of the chain are secured to rods 54 and 55 which pass through the fork like members 56 and 57 respectively, these each being provided with a socket 58 to receive the ball 59 formed on the end of the rod pertaining thereto.

Figures 15, 16, 17, 18:
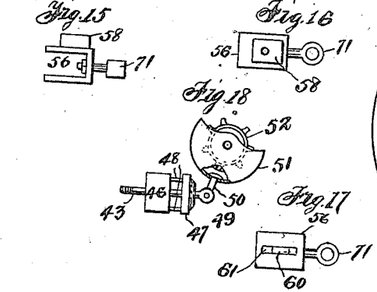

The members 56 and 57 are shown separately in Figs. 15, 16 and 17, and it will be noted that the fork members are slotted as at 60 and 61 for passage of the rods and to allow of limited swing of rods therein.

A vertical member 62 is rigidly secured to the nonrotatable shaft 8 which passes centrally therethrough, this being accomplished by the nut 63 and washer 64. The member 62 is provided with slots 65 adjacent the ends thereof for passage of the bolts 66 by means of which the members 56 and 57 are secured rotatably to the said member. The members 56 and 57 are made adjustable longitudinally of the member 62 by means of the threaded rods 67 and 68 respective to each, these being mounted to turn in the eyes 69 and 70 secured to the back of the member 62, but without longitudinal movement, while in screw-threaded engagement with the eyes 71 on the bolts 66. The heads of the rods 67 and 68 are grooved as at 72 so that they may be operated by a screwdriver passed in through the openings 73 formed in the wall 1 of the casing.

Figure 1:
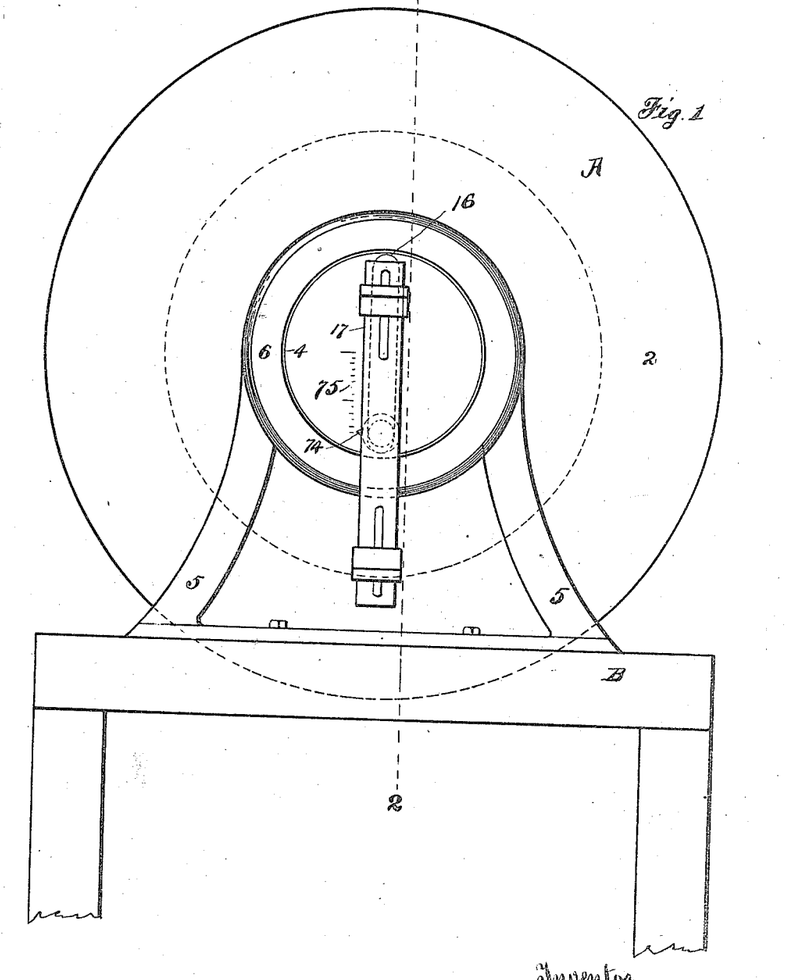
Figure 1 is a front elevation of a wood-turning lathe in which is embodied the invention.

The adjustment of the members 56 and 57, (the adjustment of the rod 41 coöperating) operates to control the extent of the movement of the pin 14 as indicated by the pointer 74 on the graduated scale 75 shown in Fig. 1. In making this adjustment it is first necessary to free the connecting rod 41 in the casting 38 by release of the set screw 42. After the adjustment is made the set screw is of course again tightened to secure the rod in its new position. In the application under consideration the adjustment has been made with a view to having the pin 14 describe an oval such as C in Fig. 6, and to this end the members 56 and 57 have been moved apart so that the slack in the chain 53 will reach farther at the ends than at the center.

It is of course understood that the sprocket wheel 52 travels on the chain 53 as a guide and that the power of the spring 23 is always opposed to the shortening of the chain, so that if the case A be revolved by means of the pulley 11, the operation will be as follows—

Figure 2:
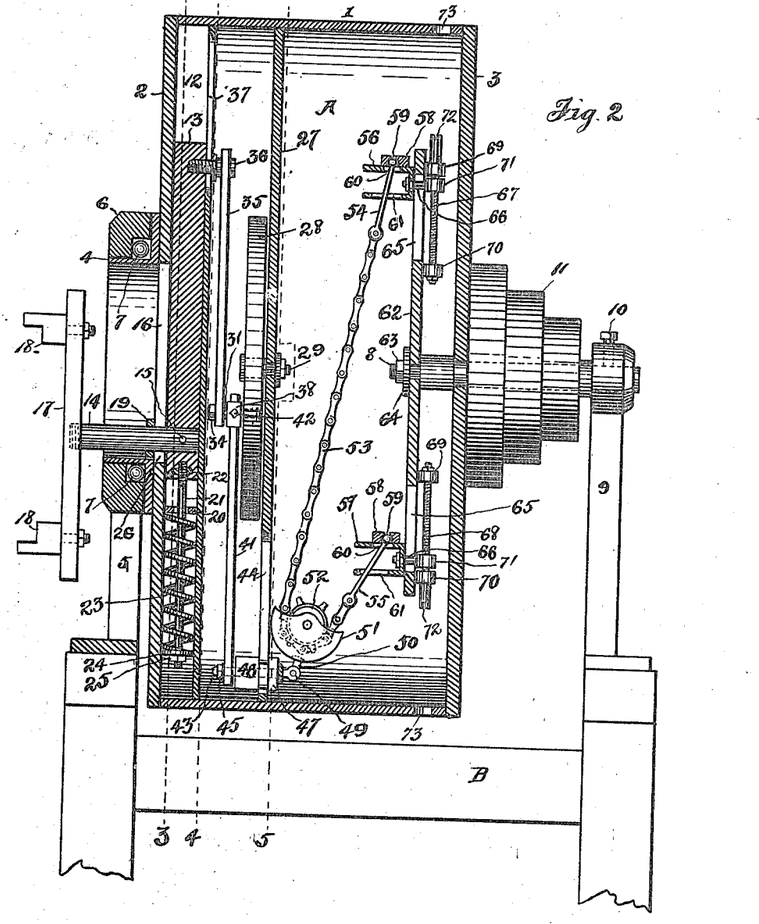
Fig. 2 is a sectional view taken on the line 2 in Fig. 1.
Figure 3:
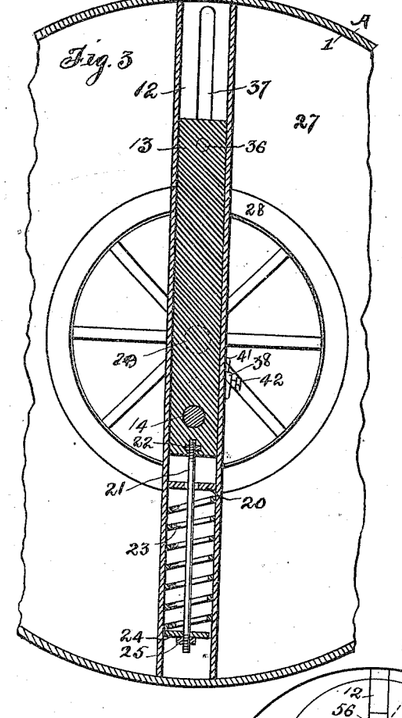
Fig. 3 is a sectional view taken on the line 3 in Fig. 2.
Figure 4:
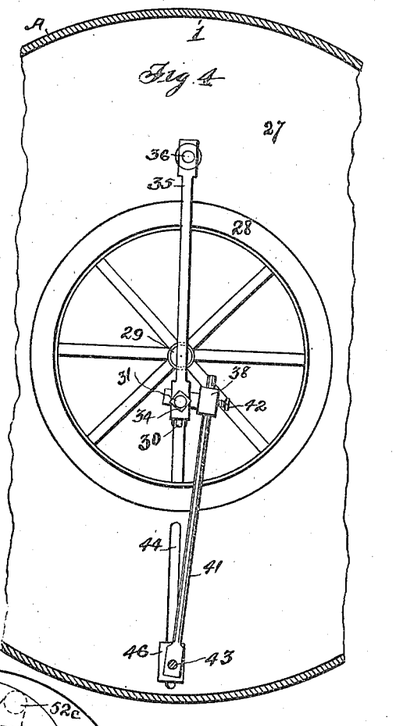
Fig. 4 is a section on the line 4 in Fig. 2.
Figure 5:
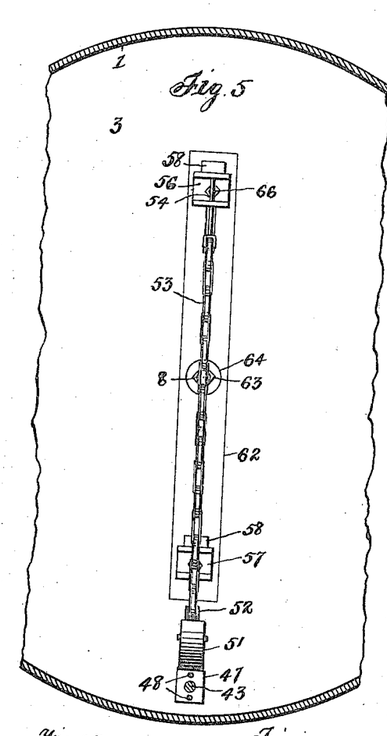
Fig. 5 is a section on the line 5 in Fig. 2.

Taking it for granted that the point 52ª indicates the position of the sprocket wheel 52 as in Fig. 2, as the case revolves clockwise the slackness in the chain will be carried out laterally by the wheel 52, the members 56 and 57 revolving on their pins 66 to accommodate themselves to the movements of the chain. As the wheel travels on the chain toward the point 52ᵇ in the diagram (Fig. 6), the pin or bolt 43, guided by the blocks 46 and 47 will travel toward the upper end of the slot 44 in the partition 27 in the case and the connecting rod 41 will force revolution of the wheel 28. When the sprocket wheel 52 reaches the position 52ᵇ in the diagram, the case A will have made a quarter turn, while the wheel 28 revolving with the case will have made a three-quarter turn, the connecting rod 35 in the meantime having operated to move the member 13 out in the tube 12 and so to have carried the pin 14 in toward the point 14$^b$ in the diagram, this being gradually effected by the gradual shortening of the chain 53 toward the center.

As the wheel 28 is a fly wheel and has a heavy rim as shown, the stored power easily carries it past the center, at which time, the wheel 52, having passed the point 52$^b$, is traveling toward the position 52$^c$, having reached which, one side of the oval C has been described, the casing A has made a half revolution and the wheel 28 a revolution and a half. From this it will be seen that while completing the oval C the wheel 28 when revolving in the same direction makes three complete revolutions to a single revolution of the casing A, but if the wheel were revolved in a direction contrary to that of the case their revolutions would be equal.

Figure 6:
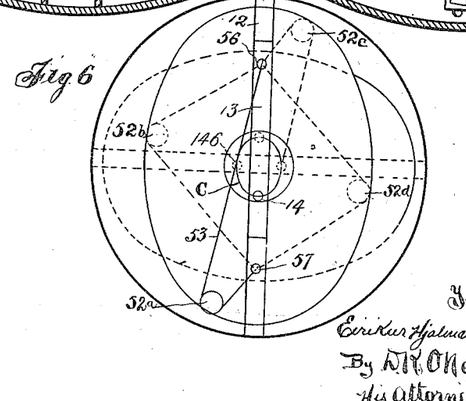
Fig. 6 is a diagram showing the movements of the parts when set to describe an ellipse.

Having the movements as described in view it will be seen that if a block of wood were secured within the jaws 18 of the lathe head 17 and a stationary turning tool set up against the face of the block, an oval such as C in Fig. 6 would be formed on the block. By adjusting the members 56 and 57 toward each other a sufficient distance but always equally distant from the center, it would be possible to have the chain equally slack all around the center in which case a true circle would be described on the block of wood mentioned. And again, if one of the members, 56 or 57, were secured at a point closer to the center than the other, a pear shaped figure would be described on the block.

From this it will be seen that a variety of figures may be arranged to be described on a block of wood or other material by changes of the adjustments described.

It will also be noted that there is no reason why the case A might not be made stationary and the member 62 to revolve, in which case the rotary motion of the member 62 would be transmitted to the member 13 in reciprocatory form and the pin 14 would merely move back and forth in the slot 16.

Figure 19:
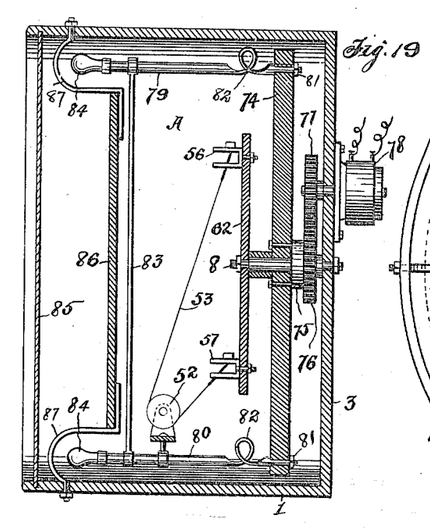
Fig. 19 is a sectional view showing the device as applied to an electrical display device.
Figure 20:
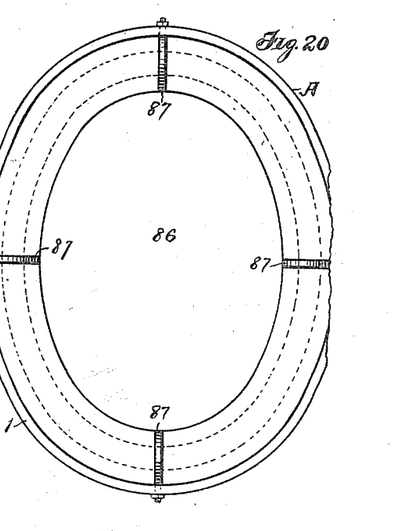
Fig. 20 is a front elevation of the device as in Fig. 19, the dotted lines showing the path of the electric lights.

In Figs. 19 and 20, which show the device in connection with an electric sign or window attractor, the casing A may be of oval shape and the casing A and member 62 are both stationary while a member 74 is revolubly mounted on the stationary shaft 8, the said member being bolted through a spacing sleeve 75 to the gear wheel 76 in mesh with the gear wheel 77 driven from the motor 78. The member 74 carries a pair of forwardly projecting members 79 and 80 preferably secured thereto adjacent the ends thereof by bolting through as shown at 81. The members 79 and 80 are resilient by reason of the coils 82 formed in each and they are connected in spaced relation by a bar 83 which is preferably also of yielding material to allow it to give to the movements of the members which it connects. Each of the members 79 and 80 carries at its forward end an electric lamp 84 these being energized by the usual means which, as they form no part of the present invention, are not shown.

The casing A is provided with a front 85 of transparent material and an opaque placque 86 is carried in spaced relation to the casing at the rear of the front 85, by brackets 87, curved as shown to avoid the lamps 84 and to carry the placque in a position to be illuminated thereby.

The operation of this device is similar to that previously described, and as the sprocket wheel follows the flexible member 53 the lamps 84 by reason of the yielding nature of their supporting members, follow the path indicated by the dotted lines in Fig. 20. The placque 86 may carry an inscription of advertising value, and if the speed of the device be made sufficiently rapid, this, when viewed from the front, will appear to be surrounded by a continuous band of light, which, by the use of colored lights may be made very attractive.

Figure 21:
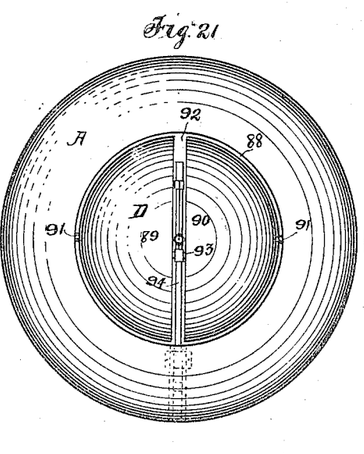
Figs. 21 and 22 show the device in connection with an astronomical illustrator, in which two bodies are revolved at right angles the one about the other.
Figure 22:
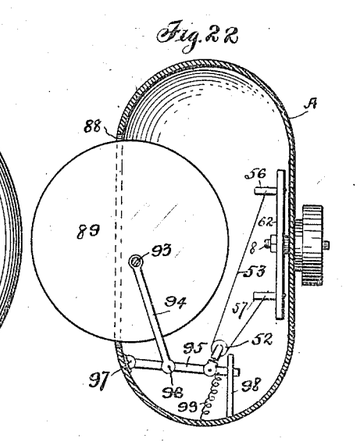

Figs. 21 and 22 show the manner in which the movement may be made to revolve two bodies at right angles to each other. In the form shown the application is of illustrative value only, though it is believed that it may be ultimately made use of in the construction of static electric machines. In this application the casing A is circular in its greatest dimension and oval in cross section and formed with a circular opening 88 in front. A split sphere D is mounted in the opening 88 the halves 89 and 90 of the sphere being pivoted as at 91 to the sides of the opening. The hemispheres are separated to provide a space 92 therebetween and a pin 93 rigidly connects the halves off center to form a crank. A connecting rod 94 is mounted on the crank pin 93 and extends through the space 92 to connect with a lever 95 at the pivotal point 96, the lever being fulcrumed at the point 97 and extending rearwardly of the point 95 to a forked member 98 between the prongs of which its movements are guided. The wheel 52 is swiveled on the lever between the point 96 and the guide 98 so that when the case A is revolved the movement of the wheel 52 on the flexible member 53 serves to draw the lever 95 toward the center, a spring 99 being opposed to this movement and operative to reverse the same at the proper moment. The sphere D is thus revolved in the opening 88 at right angles to the movement of the case A and at the rate of two revolutions to one of the case.

Figures 23, 26:
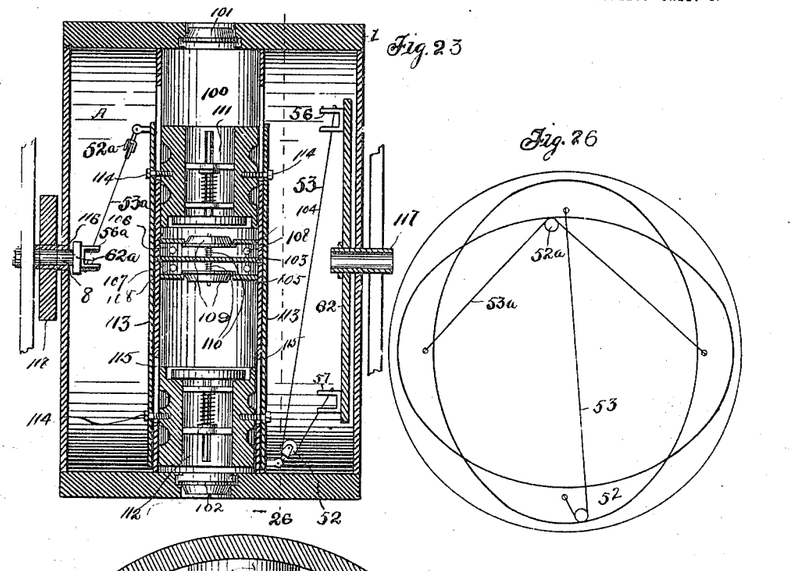
Fig. 23 is a sectional view of an air pump in which the device is used to cause the reciprocation of the pistons.
Fig. 26 is a diagram of the movements of the piston actuating parts.
Figures 24, 25:
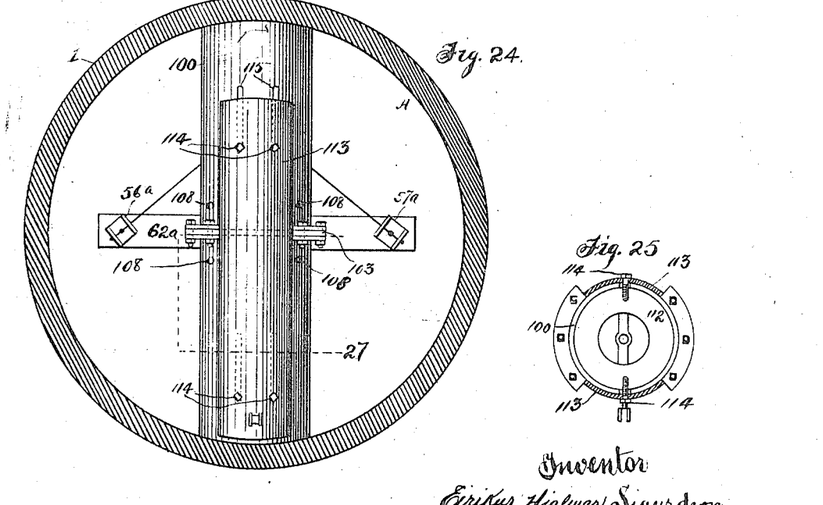
Fig. 24 is a section taken on the line 26 in Fig. 23.
Fig. 25 is a section taken on the line 27 in Fig. 24.

Figs. 23, 24 and 25 show the device as applied to an air pump to reciprocate the pistons and Fig. 26 is a diagram of the movements of the actuating parts. In these figures the member 62, the flexible member 53 and the sprocket wheel 52 are duplicated by the members 62ª, 53ª and 52ª, the duplicates being arranged at right angles to the originals to coöperate therewith and to do away with the necessity of springs to assist in any part of the operations. In these figures 100 indicates a cylinder passing diametrically across the casing A, the latter having its peripheral wall 1 thickened to give fly-wheel effect and inwardly opening valves 101 and 102 in the wall communicating with the interior of the cylinder.

The cylinder 100 is divided midway of its length by a lateral plate 103, this being preferably accomplished by making the cylinder in two flanged sections to bolt together on the plate, as shown in Fig. 27. Further partitions 104 and 105 are provided in the cylinder on the opposite sides of the plate 103 and spaced therefrom to provide the chambers 106 and 107 having communication with the interior of the casing A by the openings 108 in each. Valves 109 in the partitions 104 and 105 open into the chambers from the cylinder, these being normally maintained in closed position by the springs 110 on the guide pin passing through the valve covers. Pistons provided with valves 111 and 112 are mounted in each end of the cylinder, the pistons being connected for similar movement by slide plates 113 outside the cylinder, these having case screws 114 passing through slots 115 in the walls of the cylinder and into the fabric of the pistons.

The wheels 52 and 52ª are swiveled on the sliding plates on the opposite sides of the cylinder and at the opposite ends of the said plates as clearly shown in Fig. 25, and as previously mentioned, the members 62 and 62ª are at right angles to each other, so that when the wheel 52 is at one end of the flexible member 53 the wheel 52ª is at the center of the flexible member 53ª. This is clearly shown in the diagram, Fig. 28. The casing A is rotatably supported on the one side by the sleeve (a part of the casing) 116 on the shaft 8, and on the opposite side by a stationary tube 117 which also forms an exit for the air pumped into the casing A.

The casing is revolved from a suitable source of power by the pulley 118 on the sleeve 116, and as it revolves the wheels 52 and 52ª travel on their respective flexible members 53 and 53ª, thus alternatively serving to reciprocate the valves 111 and 112 in the cylinder, these alternately receiving the air through the valves 101 and 102 and forcing it on through the valves 109 into the chambers 106 and 107 from which it passes by the openings 108 into the casing A, thence out through the pipe 117 which may be lengthened to reach a consumer of the air so pumped.

It will be noted that as in the case of the fly wheel 28 previously mentioned, there are two complete reciprocations of the piston valves 111 and 112 to each revolution of the casing A, so that great pumping capacity may be secured with a low initial speed.

From the foregoing description in conjunction with the illustrations used it will be seen that the device provides in compact form a novel movement capable of a great variety of useful applications and that these were not exhausted in the examples shown but that many others will readily occur to persons skilled in the arts to which the device may pertain.

Having thus fully described my said invention, what I claim is—

1. A device of the kind described comprising a rigid member, a flexible member having its ends spaced apart and connected with the rigid member to form a loop, a yieldingly supported rotatable member adapted to travel in the loop as a guide and to maintain the said loop under tension, and means to revolve the rotatable member in a plane parallel with that of the rigid member whereby the rotatable member is constrained to follow a path delimited by the slackness in the loop.

2. A device of the kind described comprising a rigid member, a flexible member having its ends spaced apart a distance less than the length of the same to form a loop, and means adjustably connecting the ends of the loop with the rigid member on opposite sides of the center thereof; a yieldingly supported rotatable member adapted to travel in the loop as a guide and to maintain the loop extended, and means to revolve the rotatable member in an orbit the plane of which is parallel with that of the rigid member.

3. A device of the kind described comprising a rigid member, a flexible member having its ends spaced apart to form a loop and adjustably connected with the rigid member at opposite sides of the center thereof; a rotatable member adapted to travel in the loop as a guide; a reciprocable member with which the rotatable member is connected, and resilient means opposed to the movement of the rotatable member in the loop in one direction and coöperative therewith to complete the movement of the said reciprocable member, and means to revolve the reciprocable member and its connections around the center line of the rigid member.

4. A device of the kind described comprising a rigid member, a flexible member having its ends connected with the rigid member on opposite sides of the center thereof to form a loop, a yieldingly supported rotatable member adapted to travel in the loop as a guide, and means to cause travel of the rotatable member in the loop in a plane parallel with that of the rigid member.

5. A device of the kind described comprising a rigid member and a reciprocable member having a guide by which the plane of its movement is maintained parallel and co-axial with that of the rigid member; a flexible loop member spanning the center of the rigid member and secured thereto; a rotatable member adapted to travel in the loop as a guide; resilient means by which the rotatable member is retained in engagement with the loop, and means to revolve the reciprocable member and therewith, the rotatable member.

6. In a device of the kind described, the combination with a rigid member and a flexible loop carried thereby, of a reciprocable member having a guide by which its movement is directed across the center of the rigid member, and a spring by which its movement in one direction is opposed, a wheel having its center in line with the center of the rigid member, a crank on the wheel, a rod connecting the crank with the reciprocable member, a rotatable member mounted to travel in the loop as a guide, and a second rod connecting the crank with the rotatable member, guide means whereby the movement of the second rod is directed radially, and means to revolve the reciprocable member on the line passing through the center of the wheel and rigid member.

7. A device of the kind described comprising two members, one of which is mounted to rotate in a plane parallel with that of the other, a loop having its ends secured to one of the said members at diametrically opposite points, and a wheel positioned off center from the other member and yieldingly carried therefrom, adapted to travel in the loop as a guide.

In testimony whereof, I affix my signature.

EIRIKUR HJALMAR SIGURDSON.